United States Patent [19]
Davenport

[11] Patent Number: 5,495,986
[45] Date of Patent: Mar. 5, 1996

[54] METHOD FOR PROVIDING A FUEL MIXTURE

[76] Inventor: Ricky W. Davenport, 814 Omega Dr., Lafayette, La. 70506

[21] Appl. No.: 368,386

[22] Filed: Dec. 30, 1994

Related U.S. Application Data

[63] Continuation of Ser. No. 60,753, May 12, 1993, abandoned.

[51] Int. Cl.$^6$ ............................. B02C 23/36; B02C 23/08
[52] U.S. Cl. ................................................. 241/21; 241/24
[58] Field of Search .......................... 241/21, 24, 46.08, 241/46.11, 82, 188.2, 259.1, 259.2, DIG. 14, DIG. 38

[56] References Cited

U.S. PATENT DOCUMENTS

| | | | |
|---|---|---|---|
| 2,286,545 | 6/1942 | Hoehn | 241/82 |
| 3,713,594 | 1/1973 | Blakley et al. | 241/46.08 |
| 4,135,671 | 1/1979 | Kohrs | 241/46.11 X |
| 4,284,514 | 8/1981 | Wright | 241/DIG. 38 X |
| 4,691,867 | 9/1987 | Iwako et al. | 241/46.08 X |
| 4,735,368 | 4/1988 | Janko et al. | 241/DIG. 38 X |
| 4,883,363 | 11/1989 | Pillon et al. | 241/188.2 X |
| 4,964,914 | 10/1990 | Leath | 241/DIG. 38 X |
| 5,139,204 | 8/1992 | Shawl et al. | 241/DIG. 38 X |
| 5,205,495 | 4/1993 | Garnier | 241/DIG. 14 X |
| 5,233,932 | 8/1993 | Robertson | 241/DIG. 14 X |
| 5,257,586 | 11/1993 | Davenport | 110/246 |
| 5,269,234 | 12/1993 | Powell | 241/DIG. 38 X |

*Primary Examiner*—Timothy V. Eley
*Attorney, Agent, or Firm*—Vinson & Elkins

[57] ABSTRACT

The present invention provides a method of processing waste material and a blend stock which provides a suitable fuel and includes the steps of grinding the waste material in a tank containing the blend stock with the grinding being in at least part provided by the coaction between a rotating impeller and a stationary plate so that the degree to which the waste material is ground is controlled by controlling the spacing between the plate and the impeller.

5 Claims, 13 Drawing Sheets

METHOD FOR PROVIDING A FUEL MIXTURE

This application is a continuation of application Ser. No. 08/060,753, filed May 12, 1993 now abandoned.

FIELD OF THE INVENTION

The present invention relates to an improved method and apparatus for the blending of fuels and hazardous chemical solid waste into a pumpable fuel which can be burned in conventional kilns, such as cement kilns, and in industrial furnaces designed for burning liquids. The present invention also provides an improved method and apparatus for the reduction in size of solids, such as tires, and the dispersion Of such solids in a blend stock so that it can be readily used as a fuel which obtains heat from the solids and destroys the solid wastes so that they are no longer hazardous.

BACKGROUND

Cement kilns have been used to utilize waste materials to supply heat thereto and they function to destroy the liquified hazardous waste. Cement kilns function as excellent incinerators because they have operating temperatures which exceed 1800° F. and the flame temperature of the primary burner exceeds 3000° F. The residence time of combustion gases inside the kiln far exceed the required two seconds specified by the EPA. Also, the large mass of reactive minerals travelling down the length of the kiln chemically binds with inorganics to provide a stabilizing effect and the turbulent flow of alkaline mineral dust within the combustion gases flowing down the kiln provides excellent scrubbing of the gases before they are discharged to the environment.

In my copending application, Ser. No. 07/841,834, filed Feb. 25, 1992, there is disclosed an improved method and apparatus for feeding solid waste materials to the interior of a cement kiln which has unique systems for the prevention of back-flashing of combustion in the feeding system and a system for delivering the solids to the interior of the rotating drum without interfering with the drum rotation.

Prior to the present invention, a mixture of liquid and semi-liquid (sludge) waste material has been delivered to the burner of a kiln as a means of destroying the hazardous waste and obtaining usable heat from such destructive burning. Other efforts have been made to supply such wastes pneumatically as dry and powdered solids into the primary burner of a kiln. These methods greatly limit the types and amounts of solid hazardous wastes which have been burned in kiln burners and industrial furnaces.

SUMMARY

The present invention provides an improved method and apparatus for processing hazardous waste solids and combining such waste solids with a suitable liquid blend stock so the solids are dispersed sufficiently to provide a fluid stream which is readily burnable in a kiln or industrial furnace. The method involves the feeding of a suitable liquid blend stock to a dispersion tank together with partially reduced solid wastes and therein further reducing the solid wastes to a sufficiently small size and dispersing the wastes in the liquid stock and delivering the resultant stream to an accumulation tank from which the liquid dispersion may be withdrawn and delivered to a preselected burner for the destruction of the dispersed waste solids and for the generation of usable heat from the burning of such liquid dispersion. In addition to the improved means for initial preparation of the waste solids and their delivery to the dispersion tank and the means for removing metal from the waste solids, the dispersion unit includes an impellers and a stationary plate which are positioned in the bottom of the dispersion tank and the impeller rotates with respect to the stationary plate. The facing surfaces of the impeller and plate include interdigitating shear blocks and axial movement between the impeller and plate is provided so that the shear blocks can reduce the solids to smaller and smaller sizes as the impeller and plate near each other. A means is provided for the feeding of a stream of material from above the impeller downwardly through a central opening into the space between the impeller and plate which is designated the attrition zone, and the stream passes radially outward between the impeller and plate while also being subject to the actions of the shear blocks to reduce the size of the solids. A means is provided to withdraw a stream from the dispersion tank after it has been through the smallest spacing of the impellers to be used and that stream is delivered to the accumulation tank. A means is also provided to recirculate material from the accumulation tank to the dispersion tank through a suitable pump, a grinding means and a magnetic trap means. The present invention may be used with all forms of solids, such as tires, wood, waste materials which have been encapsulated in metal drums and other waste materials. The dispersion tank and the transfer means both include means for the removal of metal from the system so that it is not fed to the burner. Additionally, the present invention provides improved means for preprocessing solid wastes to be delivered to the dispersion tank of the present invention which maintains the hazardous waste solids in an inert atmosphere to ensure that no hazardous material is free to escape from the system. By utilizing the attrition zone of the present invention, it can disperse solids and semi-solids in a fluid stream as a part of the function of a rotating impeller.

An object of the present invention is to provide an improved method of preparing hazardous solid wastes which allows them to be readily burned in kiln or industrial furnaces to yield heat and cause their ultimate destruction.

Another object of the present invention is to provide an improved apparatus and method of dispersing hazardous solid wastes in a suitable blend stock so that they may be readily feel to a burner in a kiln or industrial furnace.

Still another object of the present invention is to provide an improved method and apparatus for processing hazardous solid waste which reduces the size of the solids to a sufficient degree that they may be dispersed into a stream of blend stock which can readily be fired.

A further object of the present invention is to provide an improved method and apparatus for processing hazardous solid waste materials so that they may be readily burned with an efficient and simple method which is cost effective to operate and requires little maintenance.

Still another object of the present invention is to provide an improved method and apparatus for reducing the size of solids and dispersing them in a fluid media.

BRIEF DESCRIPTION OF THE DRAWINGS

These and other objects and advantages of the present invention are hereinafter set forth and explained with reference to the drawings wherein.

DESCRIPTION OF THE PREFERRED EMBODIMENTS

Figure 1:
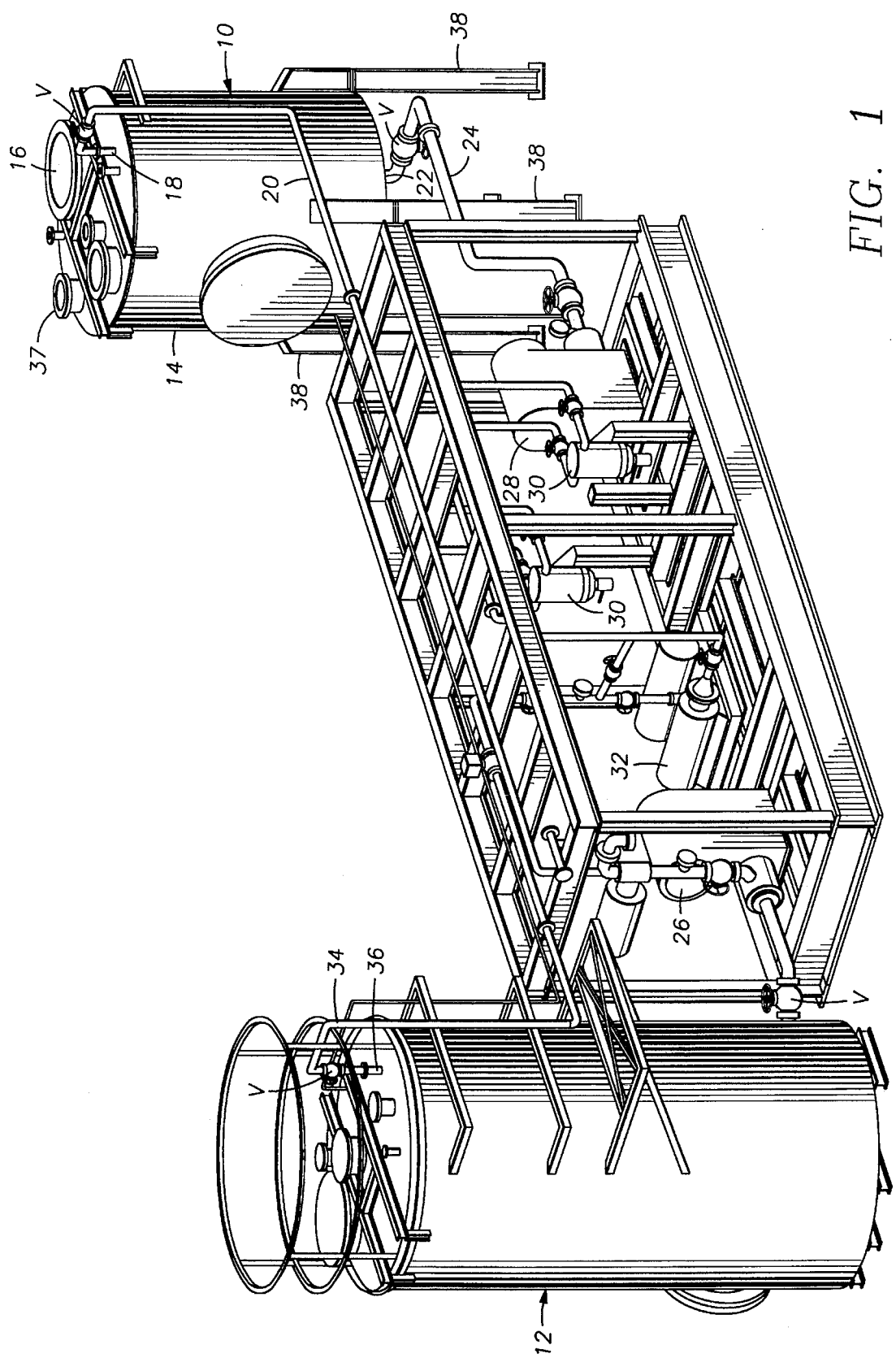
FIG. 1 is a perspective view of the system of the present invention which includes the dispersion unit and the accumulation tank and the components in the circulation system between the dispersion unit and the accumulation tank.

The improved apparatus of the present invention is illustrated partially in FIG. 1 wherein the dispersion unit 10 is shown with the accumulation tank 12 and the elements providing connections therebetween. The feeding of the solid waste materials is more completely illustrated in the other drawings as hereinafter described. Dispersion unit 10 includes tank 14 which includes solids inlet connection 16 in its upper end, recirculated fluid inlet 18 in its upper end and connecting to line 20 and discharge 22 connected into the bottom as hereinafter more completely shown and described and connected to discharge line 24. Line 20 connects into the lower portion of accumulation tank 12 and through recirculation pump 26 so that fluid in tank 12 can be recirculated to dispersion unit 10. Line 24 connects to supply pump 28 which is connected through magnetic trap 30 to grinding unit 32 and line 34 leads from grinding unit 32 to the connection 36 on the top of accumulation tank 12. Blend stock is supplied through inlet 37 in the top of tank 14. Dispersion tank 14 is supported on legs 38.

Figure 2:
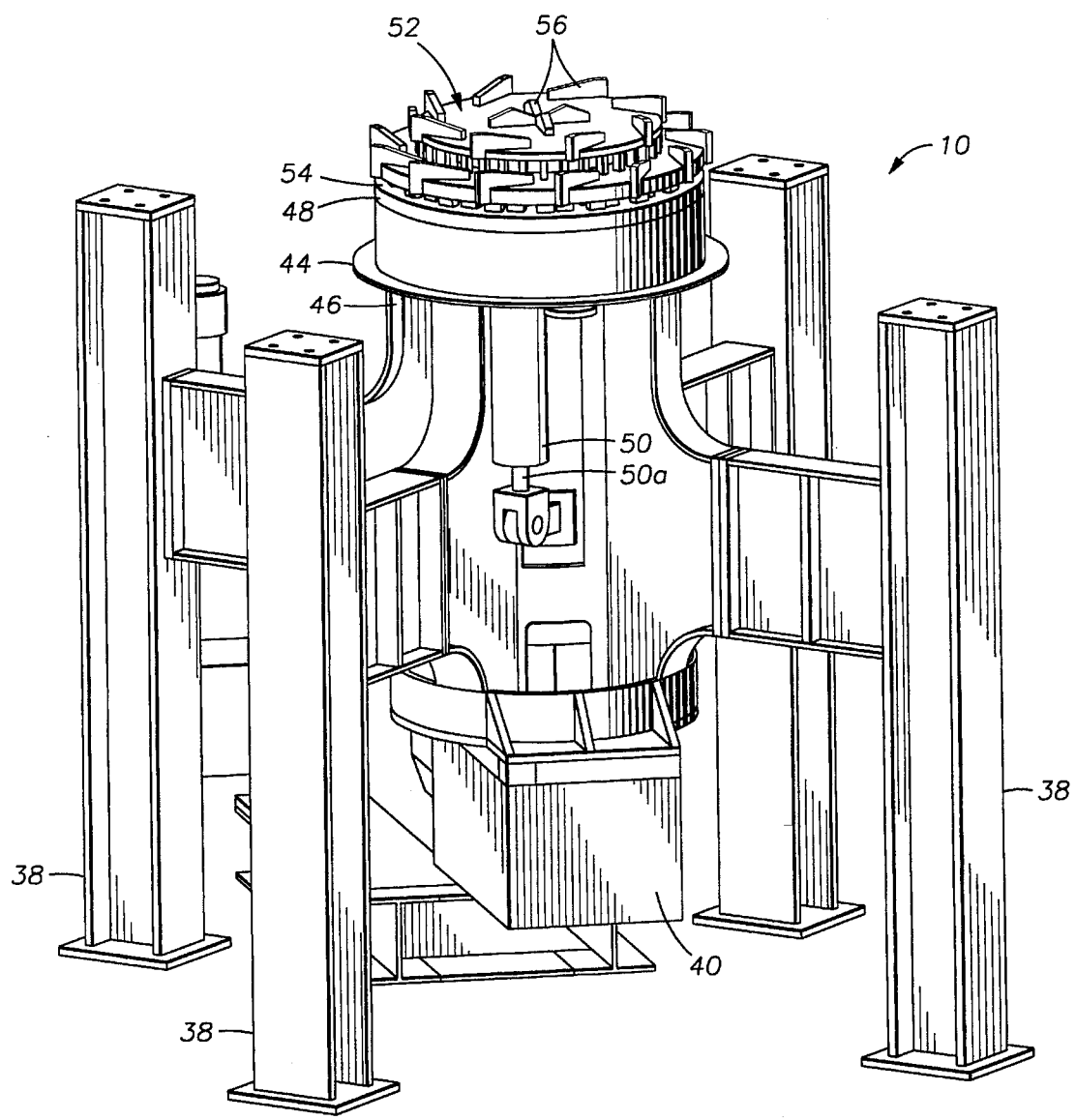
FIG. 2 is an side view of the operating equipment installed in and below the lower end of the dispersion tank with the tank removed for clarity.
Figure 3:
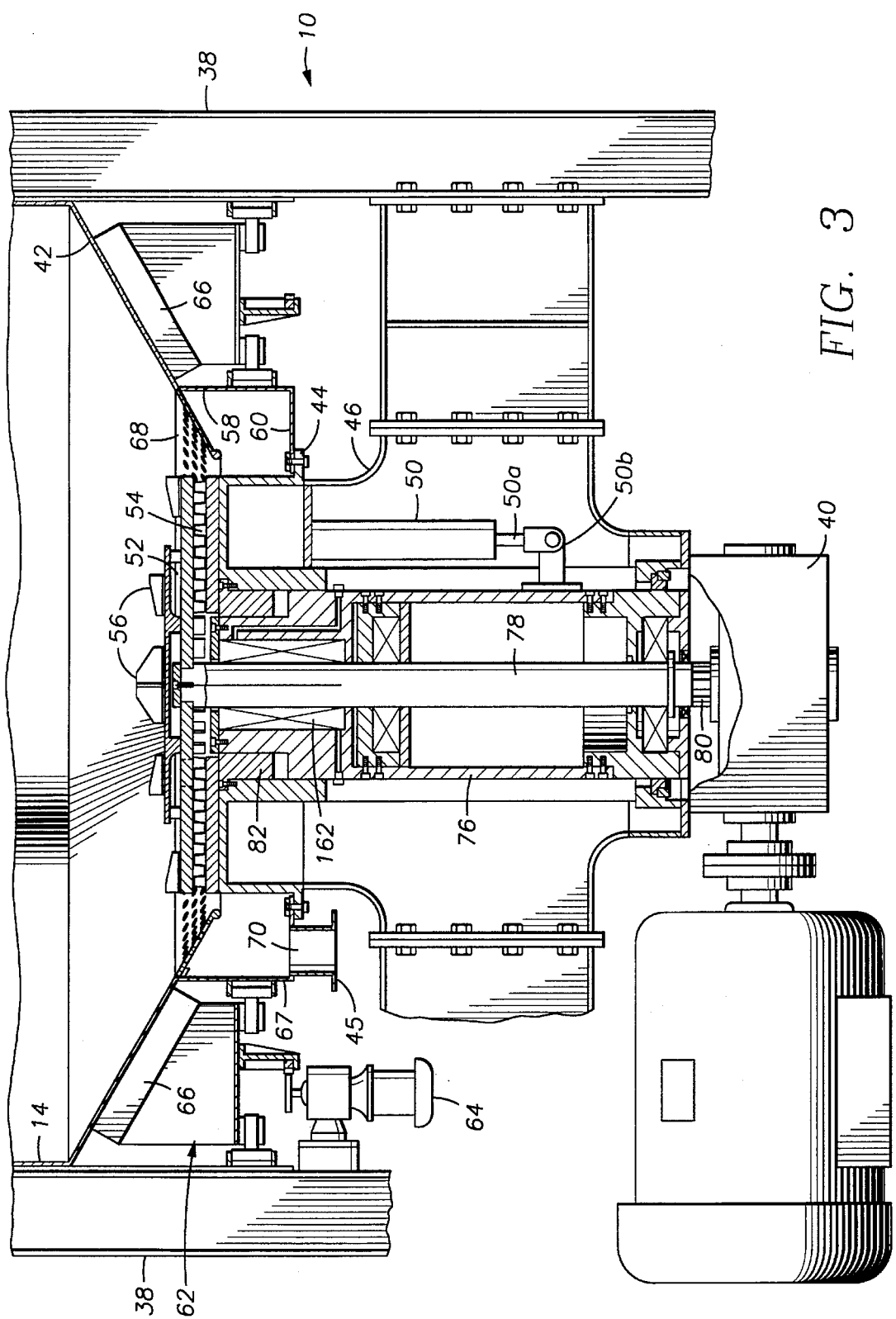
FIG. 3 is a sectional view of the lower end of the dispersion tank and the equipment contained therein and therebelow.

FIG. 2 illustrates dispersion unit 10 with tank 14 removed for clarity. Main drive 40 is supported centrally below the center of tank 14 which has conical bottom 42 which, as shown in FIG. 3, is secured to flange 44 on support structure 46. Stationary plate 48 is supported above flange 44 and cylinder 50 which is supported on support structure 46 and connects to impeller 52. Thus, cylinder 50 can raise and lower impeller 52 with respect to stationary plate 48 to control the spacing therebetween which is designated the attrition zone 54. Impeller 52 includes a plurality of vanes 56 on its upper surfaces to cause circulation of the fluid within t]he lower portion of the tank 14 and function during rotation as hereinafter described. Conical bottom 42 includes downwardly extending cylindrical section 58 and radially extending flat section 60 which connects to flange 44. Trolley 62 is supported between legs 38 and cylindrical section 58 and is rotated for the purpose hereinafter described by motor 64. Trolley 62 supports magnets 66 which are positioned immediately under bottom 42 which is of a nonmagnetic material. Perforated plate 68 is secured to the inner conical portion of bottom 42 and terminates a short radial distance outward from the outer edge of stationary plate 48. Outlet 70 is connected through radial section 60 and line 24 to supply pump 28 wherein it is delivered to accumulation tank 12.

Figure 4:
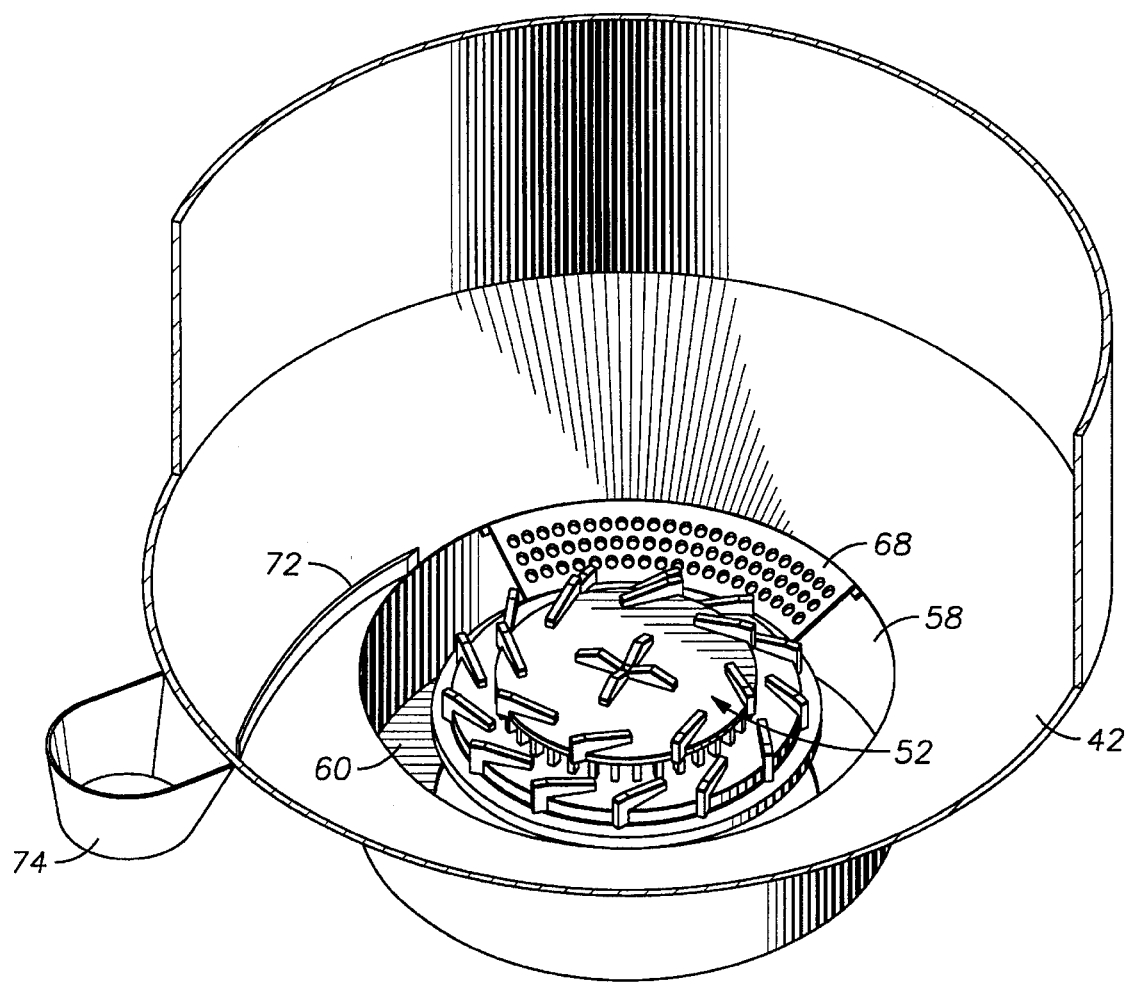
FIG. 4 is a perspective view of the equipment in the lower end of the dispersion tank.
Figure 5:
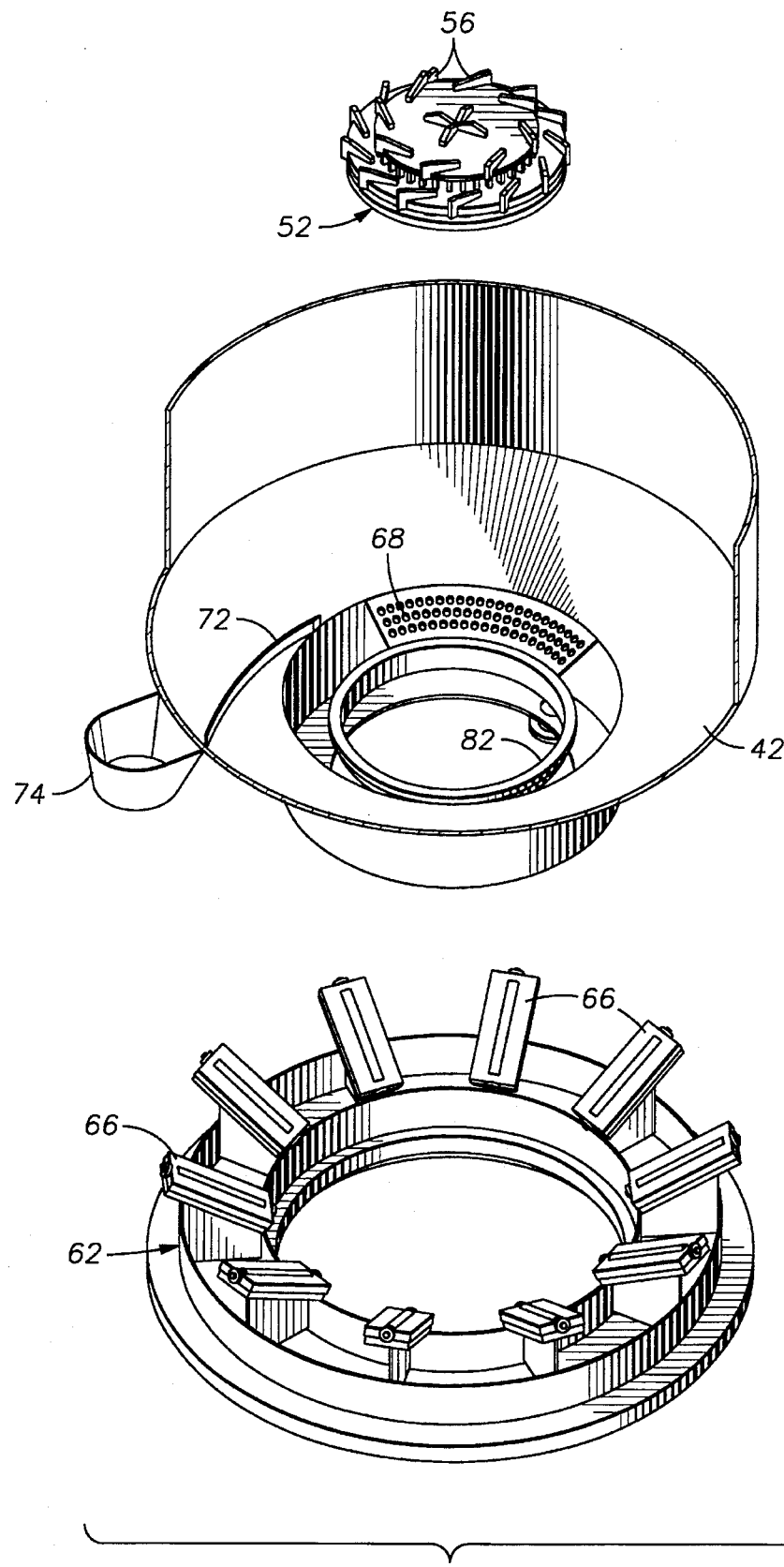
FIG. 5 is an exploded view of the dispersion equipment with the stationary plate removed for clarity.

As can be seen from FIG. 4, the iron metal which reaches the bottom of tank 14 is attracted by the rotating magnets 66 and pulled around the bottom 42 until it reaches fence 72 which is secured to the upper surface of the conical portion of bottom 42 as shown and leads to metal discharge 74.

The movement of impeller 52 is possible because the upper end of cylinder 50 is secured to the support structure 46 immediately under flange 44 and the rod 50a is connected to bracket 50b that is secured to fixed cylinder 76 surrounding drive shaft 78. Cylinder 76 is axially movable and its movement moves impeller 52 and drive shaft 78. Drive 40 is connected to drive shaft 78 by spline connection 80 which allows the relative movement between drive shaft and drive 40. Wear ring 82 is secured to support connection 46 and surrounds the upper ,end of cylinder 76.

Figure 6:
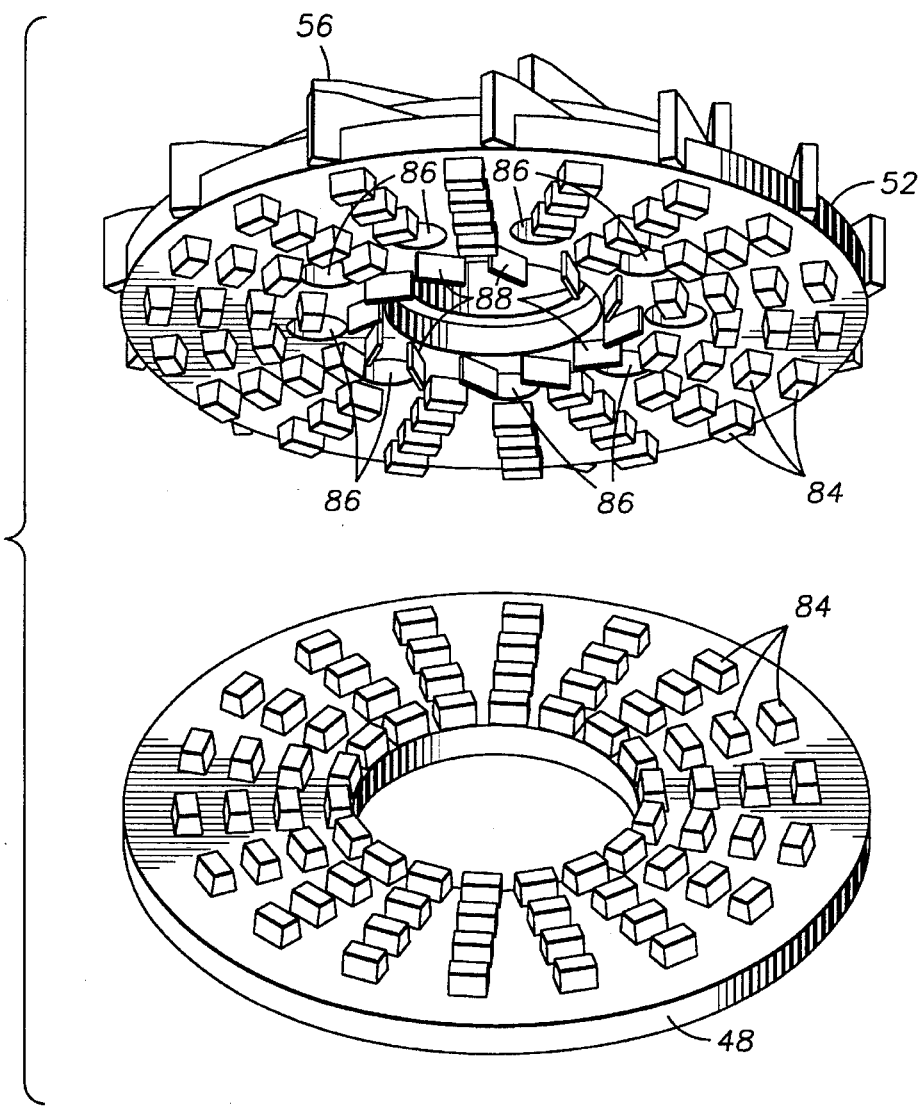
FIG. 6 is and exploded view of the impeller and stationary plate to illustrate the interdigitating shear blocks which preform the reduction is size of solids passing through the attrition zone.
Figure 7:
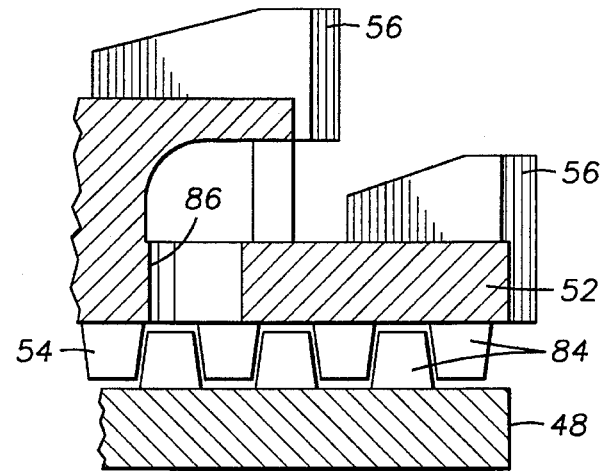
FIG. 7 is a side view, in partial section, showing the interdigitation of the shear blocks in the attrition zone.

As shown in FIG. 6, the upper side of stationary plate 48 and the lower surface of impeller 52 each include a plurality of shear blocks 84 which are spaced relative to each other so that with rotation of impeller 52 they interdigitate or intermesh. As best seen also from FIG. 6, ports 86 extend through impeller 52 so that fluid being processed is conducted into attrition zone 54 to flow outward between plate 48 and impeller 52. Vanes 88 are positioned inwardly of ports 86 so that the rotation of impeller 52 causes the fluids and solids to flow through attrition zone 54. This flow is best seen in the detail of FIG. 7.

Figure 9:
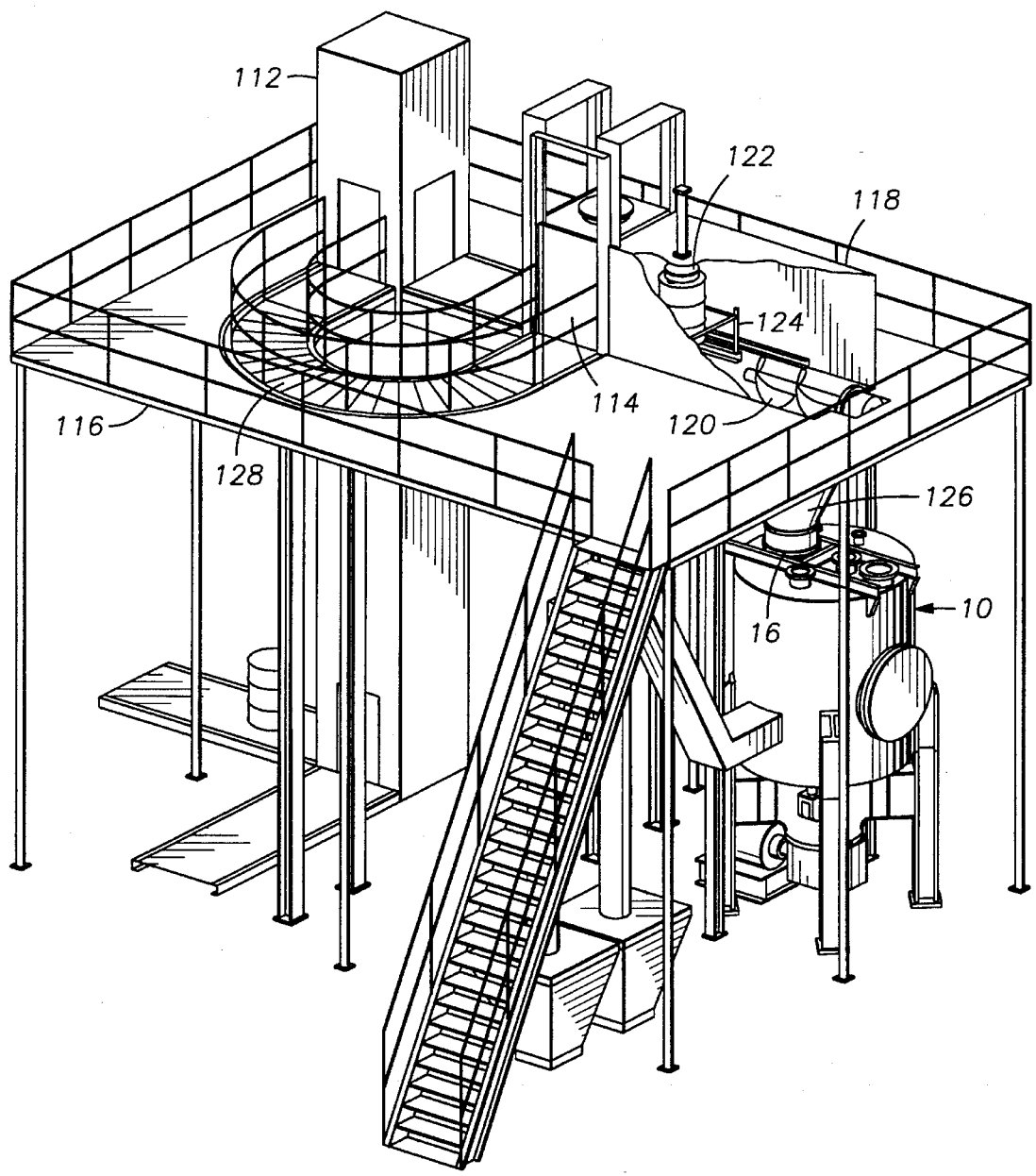
FIG. 9 is a perspective view of a drum augering and feeding system.
Figure 10:
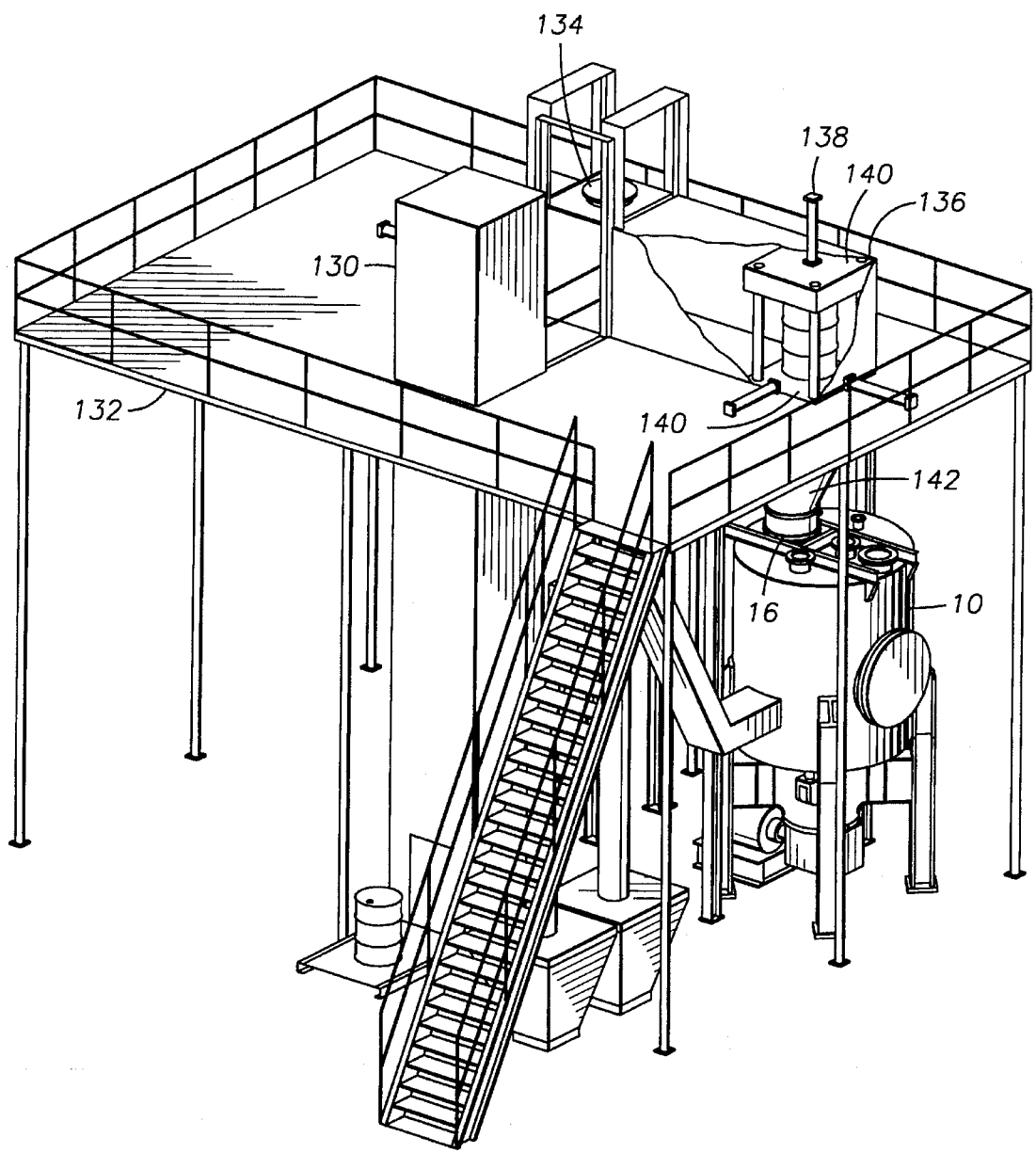
FIG. 10 is a perspective view of a drum extrusion and feeding system.
Figure 11:
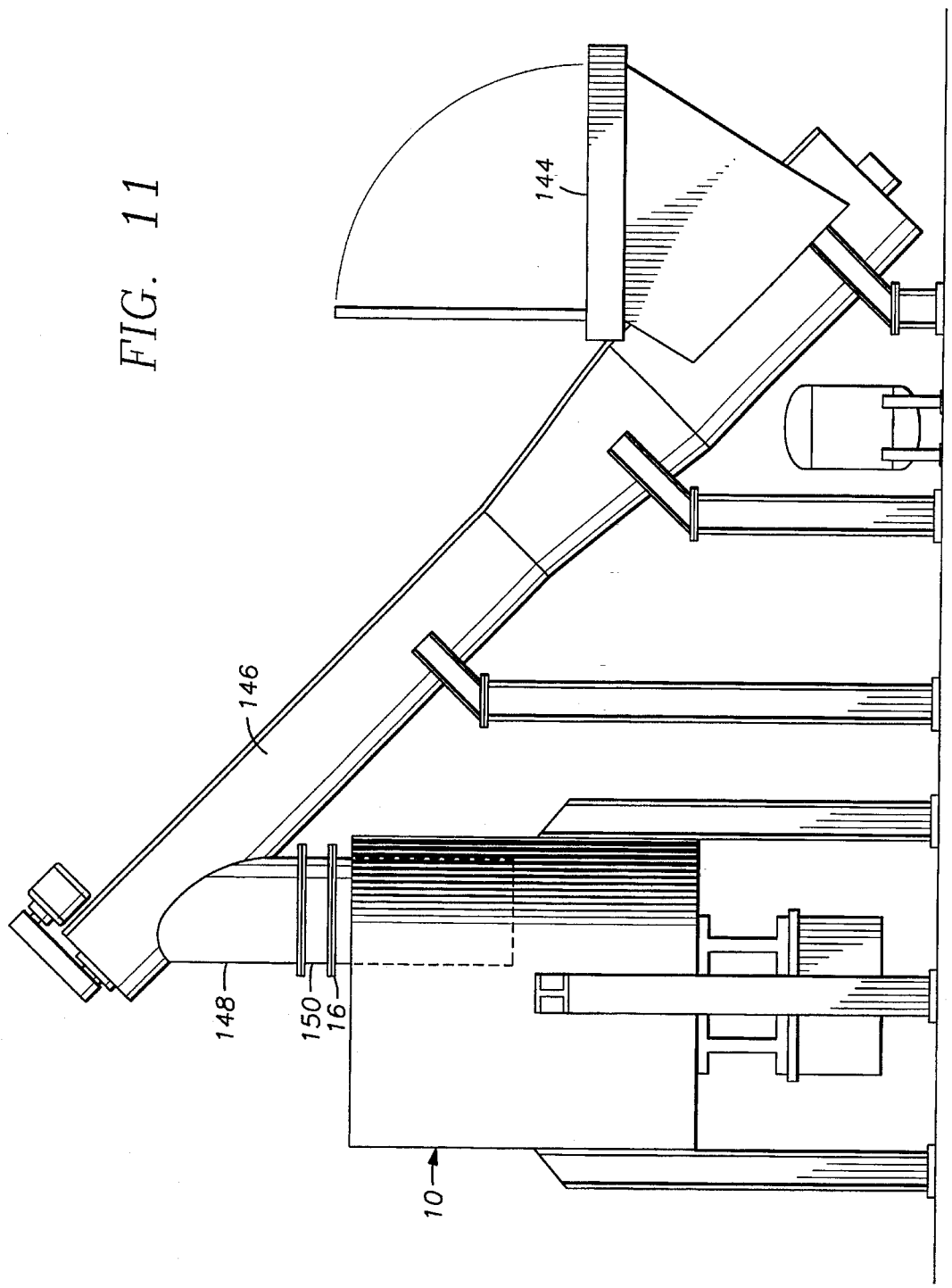
FIG. 11 is an elevation system of a bulk feed conveyor for delivering solids to the dispersion unit of the present invention

Several different methods of feeding the solids to dispersion unit 10 are illustrated in FIGS. 8 through 11. As hereinafter discussed, these systems include a drum shredding system (FIG. 8), a drum augering system (FIG. 9), a drum extrusion system (FIG. 10) and a bulk feeding system (FIG. 11).

Figure 8:
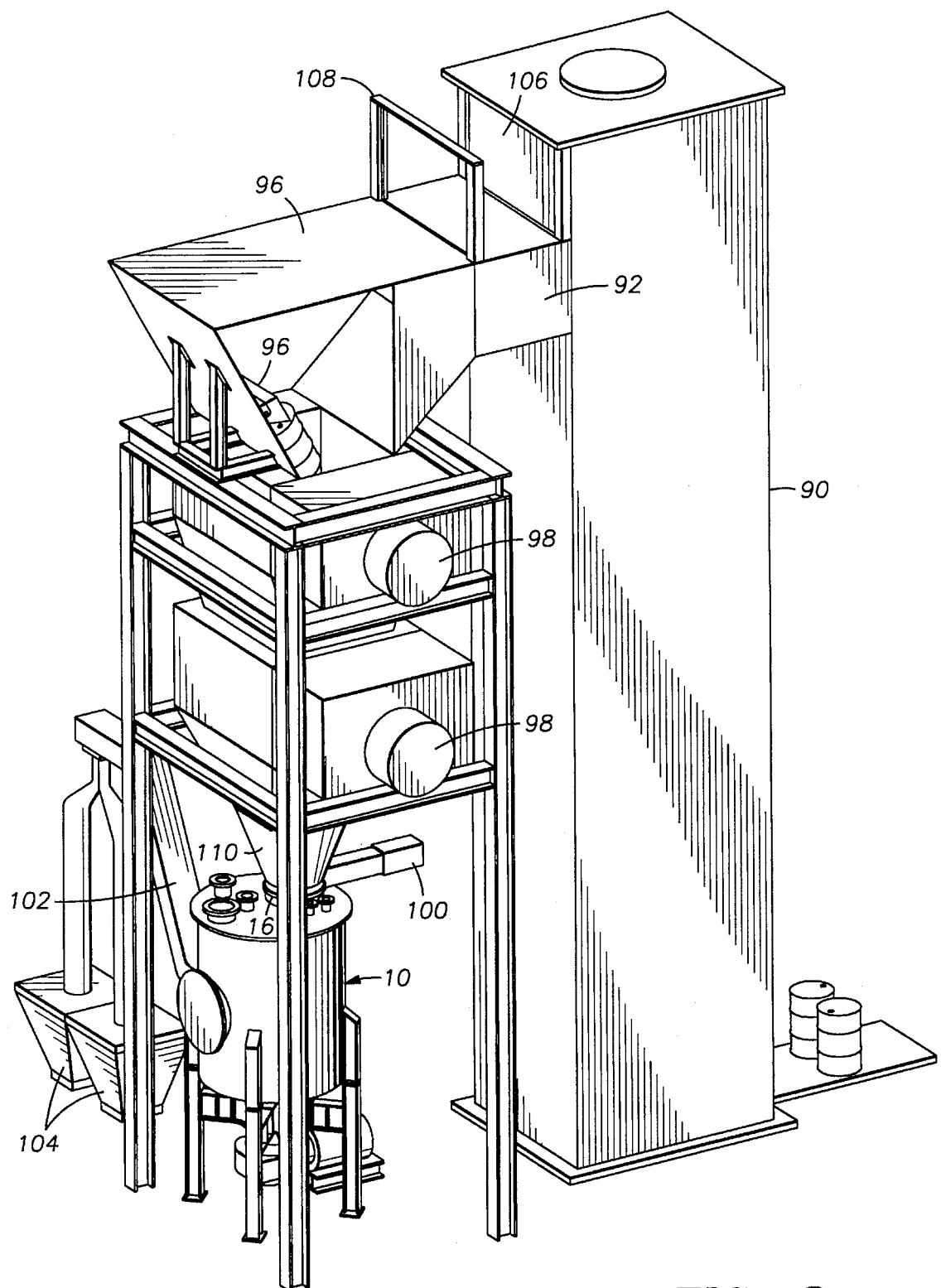
FIG. 8 is a perspective view of a drum shredding and feeding system.

The drum shredding system shown in FIG. 8 is utilized to prepare whole drums of material for feeding into the dispersion system. It includes drum elevator 90, having a suitable air lock enclosure 92, shredding chamber 94, drum feeding ram 96, shredders 98, isolation gate 100 connecting between the system and the inlet 16 on dispersion tank 14 together with such safety equipment as means for supplying an inert atmosphere, fire protection systems and emergency relief systems. Also, illustrated in FIG. 8 is dispersion unit 10 which includes metal separation and conveyor 102 (hereinafter described) to deliver the waste and scrap metal to waste hoppers 104.

Drums to be shredded together with the materials which they contain are delivered to the loading platform and moved into the elevator 90 where they are raised upwardly and then moved into air lock enclosure 92. When the drums have been moved into air lock enclosure 92 the lock door 106 between elevator 90 and enclosure 92 is closed. After providing an inert atmosphere to enclosure 92, inner lock door 108 is opened. During the time that the drums are being moved to this point they are closed so that waste material does not escape. After the drums are within the shredding chamber they are engaged by drum feed ram 96 which feeds the drums into the upper shredder 98. The discharged of shredded material from the upper shredder 98 is fed into the lower shredder 98 for further reduction in size of the drums and the waste material which was originally contained within the drums. It should be noted that multiple shredders can be used in series, in parallel or in any combination of both which produces the desired size of waste material and drum metal. Chute 110 connects the discharge of the lower shredder 98 into inlet connection 16 on dispersion unit 10.

In operation of the drum shredding system, one or more drums are transported by elevator 90 to the level of air lock enclosure 92. The shredding system outer air lock door 106 opens and a conveyor transports the drum horizontally into the air lock chamber 92. At this time, the inner air lock door 108 remains closed to isolate the air lock chamber 92 from the environment. Once the drum is inside the air lock chamber 92, the outer air lock door 106 closes and the chamber 92 is automatically purged with inert gas until the resulting oxygen level is well below ignition concentrations. Once this condition has been satisfied, the inner air lock door 108 opens and the drum is conveyed into the shredding chamber 94 where it falls into the upper shredder 98. The inner air lock door 108 closes and the feed cycle for another drum charge begins, Meanwhile, the feed ram 96 travels down vertically to provide a positive feed of the drum into the upper or primary shredder 98, It retracts to its home position when full extension of the ram 96 has occurred. Shredded product leaves the primary shredder and falls into the secondary shredder below. The secondary shredder 98a is generally equipped with narrower teeth so that the resulting shredded material is further reduced in size. Shredded material leaves the secondary shredder 98a and is discharged into the dispersion unit 10.

A drum auger system is illustrated in FIG. 9 and includes drum elevator 112 which receives drums and elevates them to the level of air lock chamber 114 immediately below platform 116, The air lock chamber 114 is connected to auger chamber 118 which includes a suitable rotating auger 120, A suitable drum lid remover 122 is provided and drum carriage 124 supports the drums and presents them in a position so that the auger 120 can enter the open top of the drum and auger the material therefrom, The material is discharged through chute 126 into the inlet 16 on dispersion unit 10. It should be noted that a shredder may be included in connection with chute 1.26 if needed. The empty drum exits the air lock chamber 114 onto conveyor 128 on platform 116 and is returned by elevator 112 to the lower level for disposal or transportation to a suitable location for reuse, A drum extrusion system is illustrated in FIG. 10 and includes elevator 130 which extends from ground level to a level above platform 132, Drums elevated in elevator 130 are discharged into airlock chamber 134 and into extrusion chamber 136, An extruder ram 138 is used to compact the drums between upper and lower platens 140a and 140b respectively. It is noted that the end of the drum may be removed or opened in any suitable manner prior to the extrusion step, Extrusion chamber 136 is positioned immediately above chute 142 which may include a shredder and connects to solid waste inlet 16 of dispersion unit 10, Thus when ram 138 compacts a drum, its contents are forced into chute 142 and the compacted drum is then removed from between platens 140a 140b and discharged from the system through air lock chamber 134 and elevator 130 or other suitable means. It is suggested that the compacted drums be washed with an automatic high pressure washing system before being removed from extrusion chamber 136.

A bulk feed system is illustrated in FIG. 11 and includes feed bin 144 which connects to and feeds the lower end of screw conveyor 146. Screw conveyor 146 elevates the material to the upper end 147 wherein it is discharged through duct 148 and isolation gate 150 into the inlet 16 of dispersion unit 10. If desired a shear shredder may be positioned in duct 148. The bulk feed system allow the feed and processing of material which is not containerized. In general, a totally enclosed screw conveyor 146 or drag conveyor is used to transport bulk material from a feed hopper to the dispersion unit 10. The feed conveyor 146 is variable speed to yield any desired feed rate and the feed hopper 144 is sized to accommodate a tilt hopper load or a track hoe bucket load. It may also contain an isolation gate similar to that used in duct 148 for use when the bulk feed conveyor is not in service. A transition chute 148 routes the extruded material through a shredding device and then into the dispersion unit 10. Material is washed from the feed conveyor flights and down the transition chute 148 by a flow of blended material from the dispersion system.

Alternately bulk material can be fed to a free standing bin. After filling, the bulk feed bin is closed, then elevated and discharged into a shredding system configured similar to the drum shredding system shown in FIG. 8. This approach allows the direct deposit of material from dump trucks and other transport containers directly into the feed system without the need for further manipulation.

Figure 12:
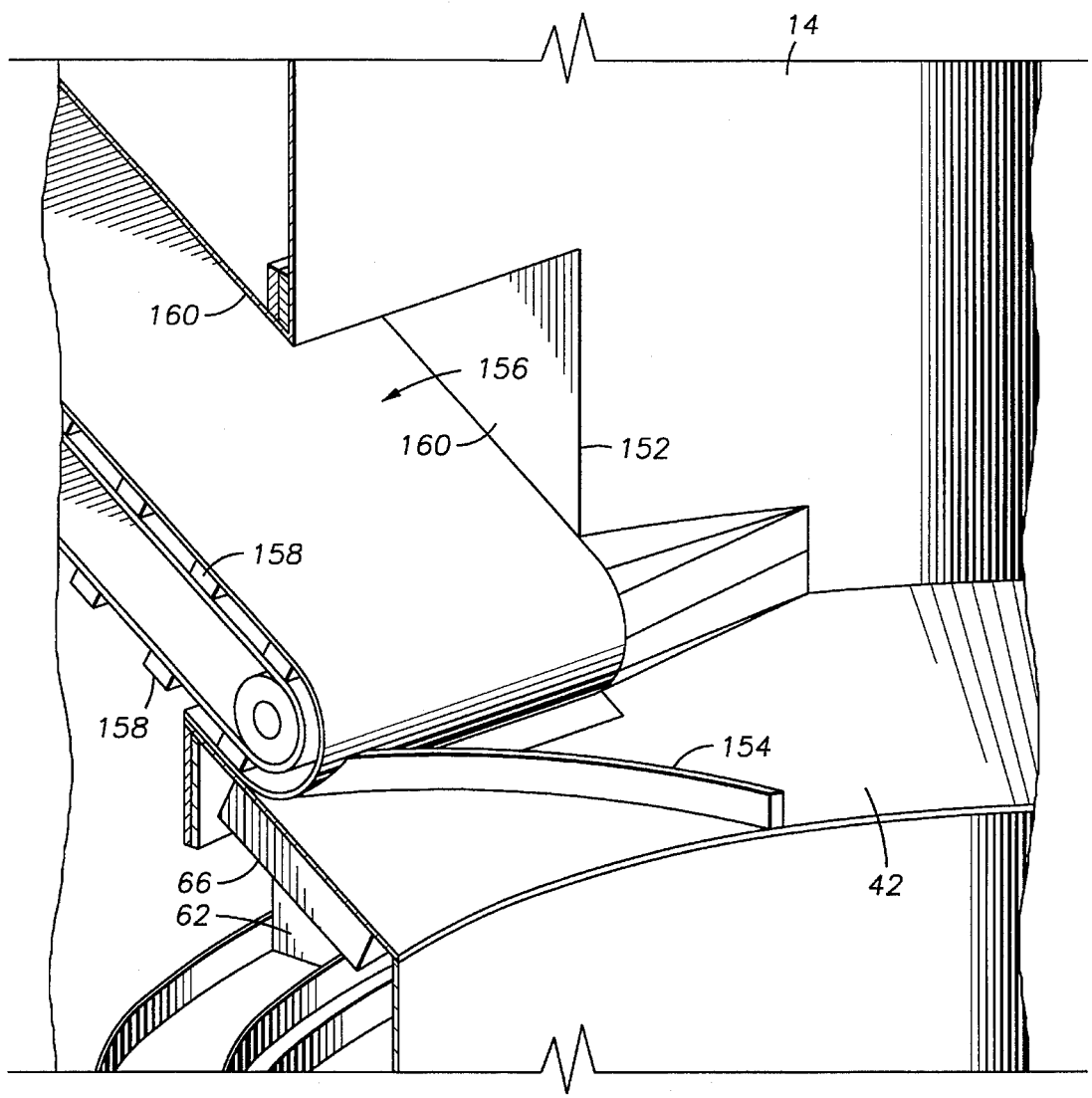
FIG. 12 is a schematic sketch of another form of magnetic conveyor system to be used for removing metal from the bottom of the dispersion unit.

A modified apparatus for the removal of metal from dispersion tank 14 is illustrated in FIG. 12. Tank 14 is shown with metal outlet 152 extending therefrom immediately above conical bottom 42. The magnets 66 are supported on trolleys 62 and rotate under bottom 42 causing the metal particles within tank 14 which settle to the bottom to move around bottom 42 to wiper 154. Wiper 154 directs the metal toward outlet 152 and removal conveyor 156 which includes magnets 158 in association therewith as shown. Thus, the metal fragments are picked up and discharged through outlet 152 in an upwardly direction. Ducting 160 surrounding outlet 152 extends upwardly to a level above the maximum liquid level to be maintained within dispersion tank 14 and removal conveyor 156 extends into a chamber (not shown) at the upper end of ducting 160 into which the metal fragments are dropped and discharged from dispersion unit 10 through a suitable chute (not shown) to a suitable collection site (not shown) The upward incline of conveyor 156 allows any waste solids other than the metal fragments to flow downwardly into the lower end of tank 14 so that the metal fragments are discharged from the system with only a minimum of the blend stock.

Figure 1A:
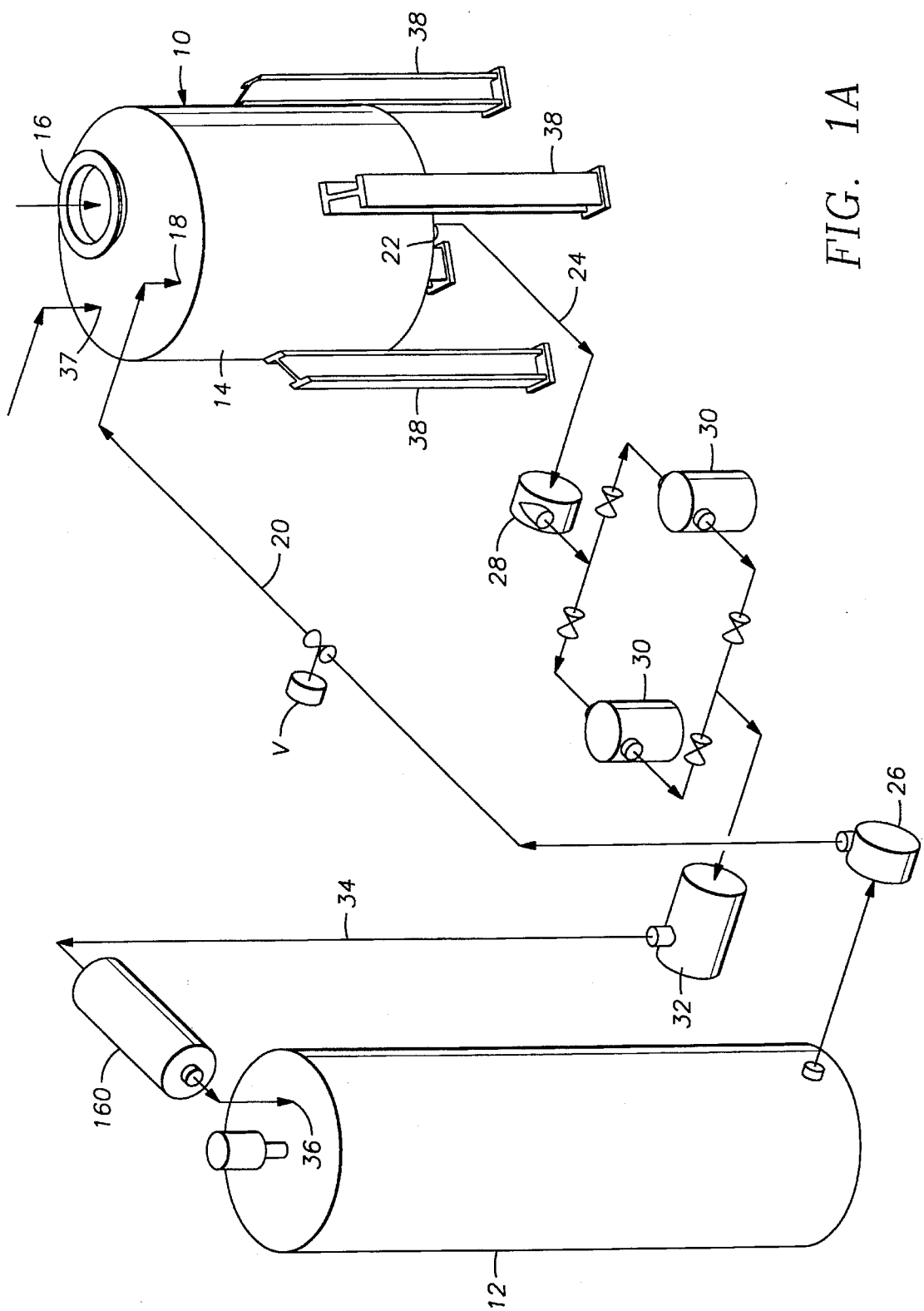
FIG. 1A is a schematic view of the system shown in FIG. 1 which more clearly illustrates the basic connections between the accumulation tank and the dispersion unit.

It should be noted with reference to FIGS. 1 and 1A that valves V are used to control the flow of fluids within the system and may thus be used to control the level of the liquid dispersion in tank 14 and also the flow of such liquid dispersion through the system, such as the recirculation of the liquid dispersion into the dispersion unit 10 for further size reduction of the solid particle size in the liquid dispersion.

In operation an organic liquid known as "blend stock" is first pumped into the system to establish a normal operating level in dispersion unit 10 and a minimum operating level in accumulation tank 12. All pumps are then started to establish a continuous flow from dispersion unit 10 through the grinding unit 32 to accumulation tank 12. Recirculation pump 26 supplies flow back to dispersion unit 10 from accumulation tank 12. With this arrangement, material is continuously recirculated through the dispersion system so that many passes can be made through dispersion unit and grinding equipment. Addition of solid waste to the system ultimately leads to the increase in operating level in accumulation tank 12 since the operating level of dispersion unit is held constant throughout the process.

After establishing the recirculation loop, waste material can be continuously fed into inlet 16 of dispersion tank 14. Dispersion unit 10 separates and removes shredded drum metal, and the remainder of the waste resides within the system until it is reduced sufficiently to meet the required specifications. A batch of blended fuel is completed when accumulation tank 12 is full and the material meets the required specifications. Once the batch nears completion, the feed of waste material is stopped. Material can be recirculated through the dispersion system when attrition zone 54 is automatically closed to a minimum gap by cylinder 50. This insures the finest particle size possible. The system can then be pumped out and the cycle is ready to begin again with the input of new blend stock. The system can also be operated in a continuous mode by constantly removing a side stream from accumulation tank 12 at a rate equal to the input rate of waste and blend stock to the system.

Dispersion unit 10 when charged causes impeller 52 to rotate. The impeller drive shaft 78 supports a mechanical seal 162 (FIG. 3) to isolate the contents of dispersion tank 14 from the environment. The vertical position of impeller 52 is controlled as a means of adjusting the particle size of the solids dispersed. Shredded ferrous metal will be continuously removed from tank 14 through metal discharge 74 or through outlet 152. The solid waste material will reside within dispersion system until it is properly ground and suspended in the liquid carrier or blend stock.

Dispersion unit impeller 52 is believed to grind and disperse material in three ways. First, impeller 52 produces turbulent hydraulic flow patterns within the lower portion of tank 14 which tend to shear material as high velocity fluid leaving the impeller 52 impinges upon solids. Second, the top of impeller 52 is equipped with vanes 56 which induce hydraulic flow and circulation within tank 14. These vanes 56 also provide coarse grinding through mechanical action against solids which they strike. Finally, the underside of impeller 52 and the upper side of stationary plate 48 include intermeshing shear blocks 84 within attrition zone 54 which provides fine grinding by physically taking in the solids and shearing them against closely spaced shear blocks 84.

Attrition zone 54 is composed of two disks which have a series of shear blocks mounted in circular patterns on each disk 48. One disk is bolted or in other ways suitably secured to the dispersion tank 14 and held stationary while the other disk is bolted to the underside of impeller 52 and rotates with it. Material enters attrition zone 54 through ports 86 near the center of impeller 52. Flow into attrition zone 54 is induced by a series of forward sweeping vanes 56a mounted on top of impeller 52. Vanes 56a tend to pressurize the inlet to attrition zone 54=. Spacing between inlet vanes 56a limits the size of solid particles that are allowed to enter attrition zone 54. This configuration avoids plugging of attrition zone 54. Finally, centrifugal forces created by the rotation of impeller 52 prevent larger particles from changing direction and entering between inlet vanes 56a. Flow is further induced through attrition zone 54 by the centrifugal force generated by the rotation of impeller 52. The shear blocks 84 on the impeller 52 actually travel within the circular paths occurring between the shear blocks 84 on the opposed stationary plate 48. The shear blocks 84 thus intermesh and provide shearing action as the rotating blocks capture material between stationary blocks. Fluid enters attrition zone 54 near the center of impeller 52 and it exits radially due to the centrifugal forces induced by impeller 52. As a particle travels radially, is sheared repeatedly. The angular velocity of the shear blocks 84 increases as the particle travels radially so that an increasing finer grind is obtained before the particle exits attrition zone 54. The intermeshing design also ensures that attrition zone 54 is self clearing and will not plug. The shear blocks 84 are tapered vertically and impeller height is controlled by the operation of cylinder 50. With this arrangement, the gap between shear blocks 84 can be controlled to yield any desired particle size. In the event it is found desirable an alternate design utilizing an impeller without the adjustment of the height of the attrition could be used but the particle size will be held constant and no compensation for wear of shear blocks 84 is available as it is with this height adjustment system.

Fluid leaving the attrition zone (along the path indicated by arrow F1) is discharged into an annular collection ring 53 positioned around the discharge perimeter of impeller 52. The discharge ring assembly 67 contains top plate 68 which has a series of perforations 68a. A pump suction nozzle 45 is also located within the bounds of discharge ring assembly 67. In this way, pump suction is guaranteed to contain only material which has traveled through attrition zone 54. All excess fluid entering collection ring 53 simply, exits into the main stream through the perforations 65a in plate 68. Material may recirculate through attrition zone 54 many times before finally being captured in pump suction nozzle 45. Plate 68 and bottom 42 of tank 14 are frusto-conically shaped and adjoining so that material will naturally migrate to impeller 52 which is located at the low point of their partial cones.

The dispersion system utilizes equipment that imparts mechanical energy into the processed liquid as heat. As a result, the temperature of the liquid is likely to rise as it is being processed. Excessively high temperatures will overload the emission control system as well as thicken the blended product due to evaporation of blend stock. To avoid this problem, a cooling system is suggested to control the temperature of the blended liquid. A heat exchanger 164 (FIG. 1A) or other suitable means may be used.

Any of the solid feeding system described herein may be used with the improved system of the present invention and should be selected based upon the character of the waste material which is to be processed. Since the waste material being processed is generally hazardous, it is important that such feeding system make provision to isolate the material from the environment and also exclude oxygen from the system to prevent problems with premature combustion of the material.

Figure 13:
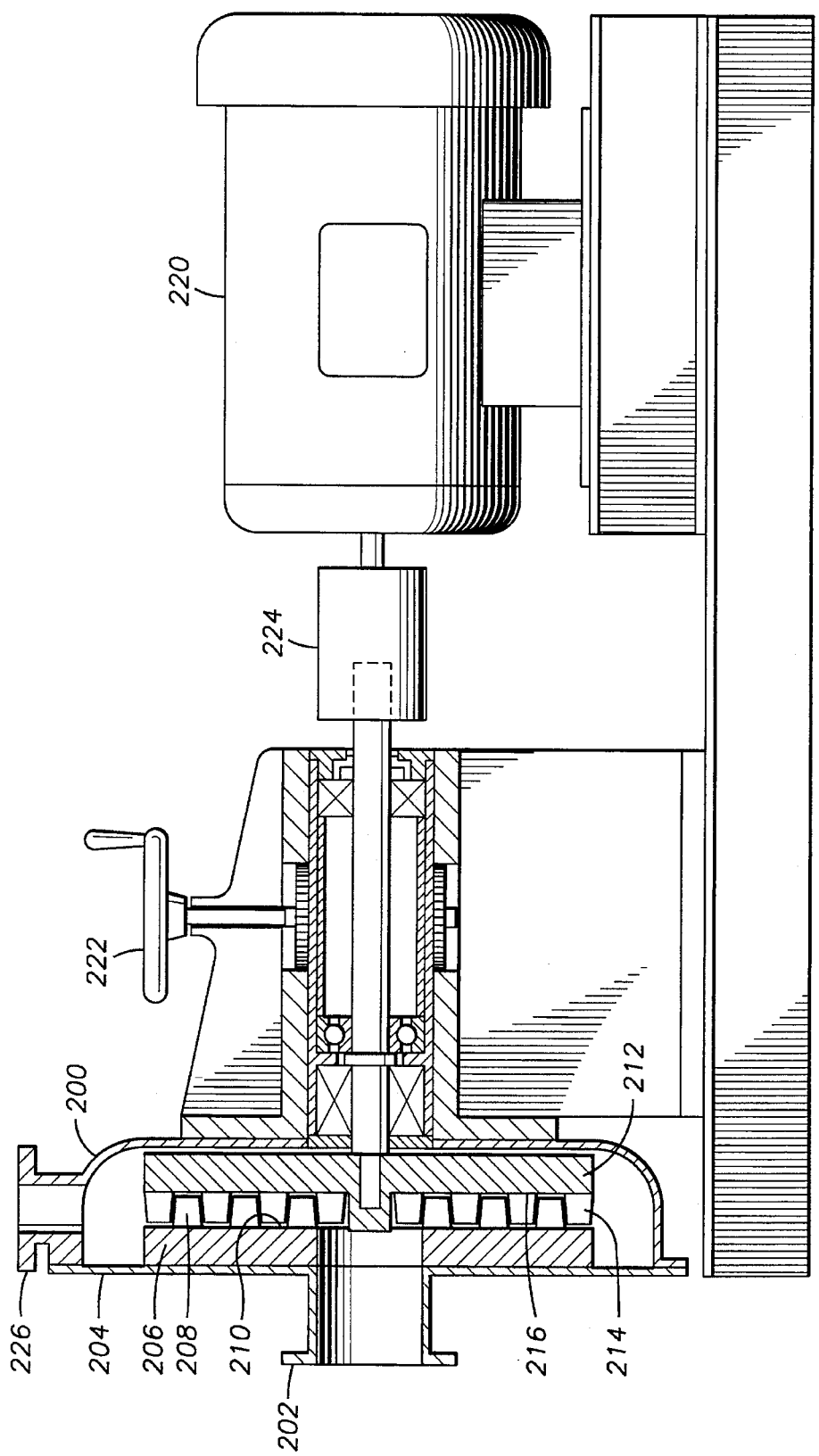
FIG. 13 is an elevation view of an attrition mill for both macerating solids and dispersing them in the fluid stream flowing through the device.

Mill 200 as shown in FIG. 13 is a modified dispersion apparatus and includes inlet 202 into mill housing 204. Stationary plate 206 is positioned on the interior of housing 204 immediately surrounding the opening of inlet 202 therethrough. Shear blocks 208 are secured to the inner surface 210 of plate 206. Rotating disc 212 is positioned within housing 204 and has shear blocks 214 positioned on its surface 216 facing the shear blocks 208 on plate 206. Shear blocks 208 and shear blocks 214 are so positioned to intermesh. Rotating disc 212 is mounted on drive shaft 218 which is rotated by motor 220. Also, as with the impellers previously described, drive shaft 218 is axially movable to change the spacing between stationary plate 206 and rotating disc 212 so that the macerating action of shear blocks 208 and 214 causes any solids entering mill 200 to be more finely ground. Handwheel 222 is connected to worm gear 223 which causes movement of drive shaft 218. This movement is possible because of the spline coupling 224 connecting drive shaft 218 with motor 220. Fluids including the finely ground dispersed solids are discharged from housing 204 through discharge 226. Mill 200 is a modified form of the present invention but is suitable for uses that involve the fine grinding of materials which are delivered thereto in a fluid and the dispersion of the ground materials in the fluid discharged from the mill 200.

What is claimed is:

1. A method for providing a fuel mixture, including a liquid blend stock and solid waste particles, said method including the steps of:

delivering the liquid blend stock to a dispersion unit, delivering solid waste pieces along with a container used to hold the solid waste pieces to said dispersion unit, causing the liquid blend stock, the solid waste pieces and the container used to hold the solid waste pieces to pass through means for shearing the solid waste pieces and the container used to hold the solid waste pieces into solid waste particles, said means for shearing the solid waste pieces and the container used to hold the solid waste pieces into solid waste particles also dispersing the solid waste particles in the liquid blend stock within said dispersion unit; and magnetically separating metal fragments from the liquid blend stock and solid waste particle mixture in said dispersion unit, discharging the liquid blend stock with the solid waste particles dispersed therein from the dispersion unit, discharging said magnetically separated metal fragments from said dispersion unit.

2. The method according to claim 1 wherein said means for shearing the solid waste pieces into solid waste particles further includes:

means for reducing the size of the solid waste particles in an attrition zone within said dispersion unit.

3. The method according to claim 1 wherein the solid waste pieces are contained within metal drums and further including the steps of:

placing the metal drums in alignment with an auger, removing the tops of the metal drums, removing the solid waste pieces from the metal drums by insertion of said auger into the metal drums, and delivering the solid waste pieces from the metal drums and the metal drums to said dispersion unit in said solid waste piece delivering step.

4. The method according to claim 1 wherein the solid waste pieces are contained within metal drums and further including the steps of:

placing the metal drums in a compaction area, compacting the metal drums to express the solid waste pieces from the metal drums, and delivering the solid waste pieces expressed from the metal drums and the metal drums to said dispersion unit in said solid waste piece delivering step.

5. The method according to claim 1 including the step of:

establishing an inert atmosphere zone in connection with said dispersion unit, placing said solid waste pieces in said inert atmosphere zone, delivering said solid waste pieces from said inert atmosphere zone to said dispersion unit.

\* \* \* \* \*